(12) United States Patent
Nakamura et al.

(10) Patent No.: US 11,843,139 B2
(45) Date of Patent: Dec. 12, 2023

(54) FUEL CELL APPARATUS

(71) Applicants: KYOCERA CORPORATION, Kyoto (JP); DAINICHI CO., LTD., Niigata (JP)

(72) Inventors: Mitsuhiro Nakamura, Kirishima (JP); Mitsutaka Shimada, Kirishima (JP); Kyosuke Yamauchi, Kirishima (JP); Takayuki Maruyama, Niigata (JP); Tatsuya Kanbayashi, Niigata (JP)

(73) Assignees: KYOCERA Corporation, Kyoto (JP); DAINICHI CO., LTD., Niigata (JP)

( * ) Notice: Subject to any disclaimer, the term of this patent is extended or adjusted under 35 U.S.C. 154(b) by 0 days.

(21) Appl. No.: 16/071,087

(22) PCT Filed: Jan. 20, 2017

(86) PCT No.: PCT/JP2017/002035
§ 371 (c)(1),
(2) Date: Jul. 19, 2018

(87) PCT Pub. No.: WO2017/126699
PCT Pub. Date: Jul. 27, 2017

(65) Prior Publication Data
US 2019/0221869 A1   Jul. 18, 2019

(30) Foreign Application Priority Data

Jan. 23, 2016   (JP) .................................. 2016-011158

(51) Int. Cl.
*H01M 8/04007* (2016.01)
*H01M 8/04* (2016.01)
(Continued)

(52) U.S. Cl.
CPC ...... *H01M 8/04074* (2013.01); *F28D 9/0075* (2013.01); *H01M 8/04* (2013.01);
(Continued)

(58) Field of Classification Search
CPC ............... H01M 8/04; H01M 8/04074; H01M 8/04007; H01M 8/0612; H01M 8/2465; H01M 8/12
See application file for complete search history.

(56) References Cited

U.S. PATENT DOCUMENTS 7,491,456 B2 *   2/2009   Ono .................... H01M 8/2425
                                                                    429/425
8,535,835 B2 *   9/2013   Nakamura ........ H01M 8/04074
                                                                    429/408
(Continued)

FOREIGN PATENT DOCUMENTS

CN          1734821 A        2/2006
JP       H08-505491 A        6/1996
(Continued)

*Primary Examiner* — Pamela H Weiss
*Assistant Examiner* — Amanda Rosenbaum
(74) *Attorney, Agent, or Firm* — VIERING, JENTSCHURA & PARTNER MBB

(57) ABSTRACT

A fuel cell apparatus includes a fuel cell module including a housing and a fuel cell housed in the housing, the fuel cell generating electric power with use of a fuel gas and an oxygen-containing gas; and a heat exchanger which carries out heat exchange between a medium and exhaust gas from the fuel cell module, the heat exchanger being arranged laterally to the housing.

16 Claims, 9 Drawing Sheets

(51) Int. Cl.
*H01M 8/04029* (2016.01)
*F28D 9/00* (2006.01)
*H01M 8/0612* (2016.01)
*H01M 8/2465* (2016.01)
*H01M 8/12* (2016.01)

(52) U.S. Cl.
CPC ..... *H01M 8/04007* (2013.01); *H01M 8/0612* (2013.01); *H01M 8/2465* (2013.01); *H01M 8/12* (2013.01)

(56) References Cited

U.S. PATENT DOCUMENTS

| | | | | |
|---|---|---|---|---|
| 2002/0131921 | A1* | 9/2002 | Ishikawa | H01M 8/0612 422/198 |
| 2004/0081872 | A1* | 4/2004 | Herman | H01M 8/04014 429/413 |
| 2008/0063912 | A1* | 3/2008 | Bronold | H01M 8/0668 429/410 |
| 2008/0081233 | A1* | 4/2008 | Rechberger | H01M 8/04074 429/423 |
| 2009/0263689 | A1* | 10/2009 | Homma | H01M 8/0612 429/411 |
| 2011/0117457 | A1* | 5/2011 | Nakamura | H01M 8/2485 429/408 |
| 2012/0251904 | A1* | 10/2012 | Izawa | H01M 8/243 429/413 |
| 2015/0380756 | A1* | 12/2015 | Orishima | H01M 8/0618 429/419 |

FOREIGN PATENT DOCUMENTS

| | | | |
|---|---|---|---|
| JP | 2003-123824 | A | 4/2003 |
| JP | 2005100942 | A | 4/2005 |
| JP | 2006-310214 | A | 11/2006 |
| JP | 2006310214 | A * | 11/2006 |
| JP | 2007234374 | A * | 9/2007 |
| JP | 2007234374 | A | 9/2007 |
| JP | 2009110753 | A * | 5/2009 |
| JP | 2009110753 | A | 5/2009 |
| JP | 2010267565 | A * | 11/2010 |
| JP | 2011134543 | A | 7/2011 |
| JP | 2011175853 | A | 9/2011 |
| JP | 2013089499 | A | 5/2013 |
| JP | 2013229120 | A * | 11/2013 |
| JP | 2013229120 | A | 11/2013 |
| JP | 2016090082 | A * | 5/2016 |
| WO | WO2013073498 | A1 | 5/2013 |

* cited by examiner

FUEL CELL APPARATUS

CROSS-REFERENCE TO RELATED APPLICATIONS

This application is a national stage entry according to 35 U.S.C. 371 of PCT Application No. PCT/JP2017/002035 filed on Jan. 20, 2017, which claims priority to Japanese Application No. 2016-011158 filed on Jan. 23, 2016, which are entirely incorporated herein by reference.

TECHNICAL FIELD

The present disclosure relates to a fuel cell apparatus.

BACKGROUND

In recent years, as next-generation energy sources, there have been proposed various fuel cell modules of the type which includes a fuel cell capable of obtaining electric power by utilizing a fuel gas (hydrogen-containing gas) and an oxygen-containing gas (air) and a housing which houses therein the fuel cell, and fuel cell apparatuses of the type which includes a fuel cell module and an exterior case which houses therein the fuel cell module (refer to Patent Literature 1, for example).

CITATION LIST

Patent Literature

Patent Literature 1: Japanese Unexamined Patent Publication JP-A 2009-110753

SUMMARY

A fuel cell apparatus according to the present disclosure may include a fuel cell module including a housing and a fuel cell housed in the housing, the fuel cell generating electric power with use of a fuel gas and an oxygen-containing gas. The fuel cell apparatus may further include a heat exchanger which carries out heat exchange between a medium and exhaust gas from the fuel cell module. The heat exchanger may be arranged laterally to the housing.

BRIEF DESCRIPTION OF DRAWINGS

Other and further objects, features, and advantages of the disclosure will be more explicit from the following detailed description taken with reference to the drawings wherein.

DETAILED DESCRIPTION

Fuel cell apparatuses are still large in size, and there may be cases where installation of such an apparatus is difficult in buildings where there are few installable places such as apartment houses, in particular. This has created an increasing demand for ever-smaller fuel cell apparatuses.

In a fuel cell apparatus according to a non-limiting embodiment, disposing a heat exchanger laterally relative to a housing allows a reduction in heightwise dimension. The following describes the fuel cell apparatus according to the embodiment in detail with reference to the drawings.

Figure 1:
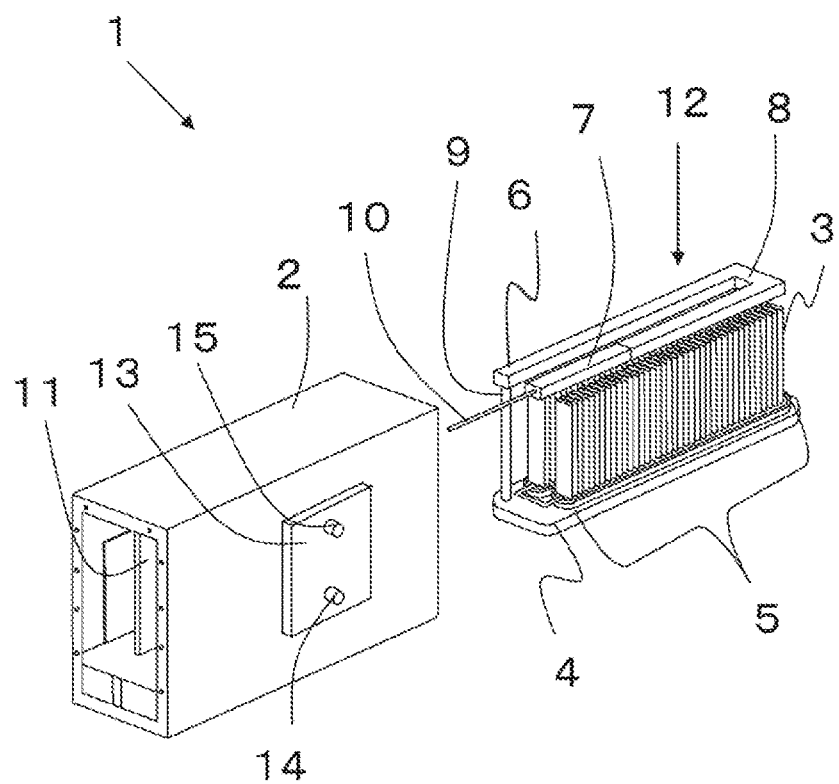
FIG. 1 is an external perspective view showing an example of a part extracted from a fuel cell apparatus according to a non-limiting embodiment.
Figure 2A:
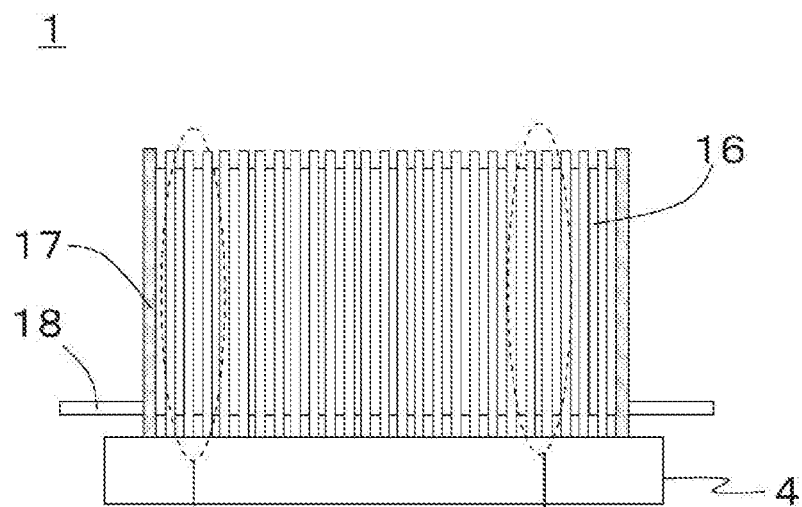
FIG. 2A is a side view showing an extracted part of a cell stack device shown in FIG. 1.
Figure 2B:
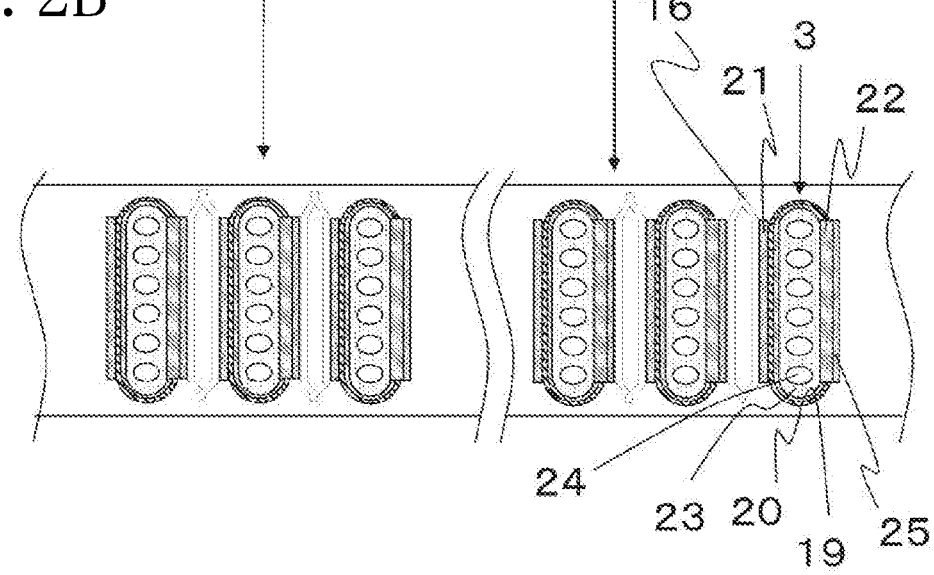
FIG. 2B is a plan view showing the extracted part of the cell stack device shown in FIG. 2A.

FIG. 1 is an external perspective view showing an example of a part extracted from the fuel cell apparatus according to a non-limiting embodiment. Moreover, FIGS. 2A and 2B are side views showing an extracted part of a cell stack device shown in FIG. 1, and FIG. 2B is a plan view showing the extracted part of the cell stack device shown in FIG. 2A. In the drawings to be hereafter referred to, similar reference numerals refer to similar parts.

In FIG. 1, of the fuel cell apparatus according to a non-limiting embodiment, there are selectively shown: a fuel cell module (hereafter also referred to simply as "module") 1 including a housing 2 and a cell stack device 12 housed in the housing 2, the cell stack device 12 generating electric power with use of a fuel gas and an oxygen-containing gas; and a heat exchanger 13 for carrying out heat exchange between a medium (such as water) and exhaust gas from the module 1. In what follows, the module 1 will be described first.

In the module 1 according to a non-limiting embodiment, the housing 2 houses therein the cell stack device 12 including two cell stacks 5 secured to a manifold 4. The cell stack 5 is composed of upstanding fuel cells 3 aligned in a row, each having an internal fuel gas channel 15 through which a fuel gas flows. Adjacent fuel cells 3 are electrically connected in series with each other, with a power-collecting member (not shown in FIG. 1) interposed therebetween. Lower ends of the fuel cells 3 are secured to the manifold 4 by an insulating bonding material such as a glass sealing material (not shown in the drawings). Moreover, a reformer 6 for producing a fuel gas which is supplied to the fuel cells 3 is disposed above the cell stack 5. The cell stack 5 is provided at each end with a conductive member, not shown, having a power-extracting portion for collecting electric power obtained by the power-generating action of the cell stack 5 (fuel cells 3) and extracting the power out of the cell stack 5. Although the cell stack device 12 is illustrated as including two cell stacks 5 in FIG. 1, the number of the cell stacks 5 may be changed on an as-needed basis. For example, the cell stack device 12 may include a single cell stack 5. Moreover, the cell stack device 12 may include the reformer 6.

Moreover, in FIG. 1, as the fuel cell 3, there is shown a cell of hollow flat type having a plurality of internal fuel gas channels through which a fuel gas flows in a longitudinal direction thereof. More specifically, there is exemplified a solid-oxide fuel cell 3 obtained by laminating a fuel electrode layer, a solid electrolyte layer, and an oxygen electrode layer one after another in the order named on a surface of a support having the fuel gas channels. An oxygen-containing gas flows between the fuel cells 3. The structure of the fuel cell 3 will be described later.

Moreover, in the fuel cell apparatus according to a non-limiting embodiment, as long as the fuel cell 3 is a solid-oxide fuel cell, the fuel cell 3 may be of, for example, a flat type or a cylindrical type, and the housing 2 may be suitably changed in shape correspondingly.

Moreover, the reformer 6 shown in FIG. 1 produces a fuel gas by reforming a raw fuel such as natural gas or kerosene which has been fed thereto via a raw fuel supply tube 10. The reformer 6 may be configured to perform steam reforming utilizing a steam reforming reaction known as a highly efficient reforming reaction. The reformer 6 includes a vaporizing section 7 for vaporizing water, and a reforming section 8 provided with a reforming catalyst (not shown) for reforming a raw fuel into a fuel gas. The fuel gas produced by the reformer 6 is fed, through a fuel gas flowing tube 9, to the manifold 4, and from the manifold 4 to the fuel gas channel formed within the fuel cell 3.

Moreover, in FIG. 1, there are shown the housing 2 with parts (front and rear faces) removed, and the internally mounted cell stack device 12 in a state of lying just behind the housing 2. In the module 1 shown in FIG. 1, the cell stack device 12 can be slidingly housed in the housing 2.

Inside the housing 2 an oxygen-containing gas introducing member 11 is located. The oxygen-containing gas introducing member 11 is located between the cell stacks 5 lying in juxtaposition on the manifold 4 so that an oxygen-containing gas flows on a lateral side of the fuel cell 3 from the lower end toward the upper end thereof.

The following describes the cell stack device 12 according to a non-limiting embodiment with reference to FIGS. 2A and 2B. A part of the device indicated by a dotted bounding circle in FIG. 2A is depicted more clearly in FIG. 2B as shown by the arrow.

In the cell stack device 12 shown in FIGS. 2A and 2B, the cell stack 5 includes a plurality of the fuel cells 3 aligned in upstanding condition, with a power-collecting member 16 interposed between adjacent cells, so as to be electrically connected in series with each other. In the cell stack 5, the lower end of each fuel cell 3 is secured to the manifold 4 for feeding a fuel gas to the fuel cells 3.

The cell stack device 12 further includes conductive members 17, each secured at a lower end thereof to the manifold 4, mounted at each end of an array of the fuel cells 3 via the endmost power-collecting member 16 so that the cell stack 5 is sandwiched between the conductive members 17.

The conductive member 17 shown in FIG. 2A is provided with a current-extracting portion 18, disposed so as to extend outward in the arrangement direction of the fuel cells 3, for extracting electric current obtained by the power-generating action of the cell stack 5 (fuel cells 3).

Now, as exemplary of the fuel cell 3, the structure of the fuel cell 3 shown in FIGS. 2A and 2B will be described.

The fuel cell 3 includes a columnar conductive support 23 (hereafter also referred to as "support 23" in abbreviated form) having a pair of opposed flat surfaces, and a fuel electrode layer 19, a solid electrolyte layer 20, and an oxygen electrode layer 21 which are successively laminated in the order named on one of the flat surfaces. A part of the cell defined by the fuel electrode layer 19, solid electrolyte layer 20, and oxygen electrode layer 21 which are laminated in the order named serves as a power-generating section for generating electric power with use of an oxygen-containing gas and a fuel gas delivered to the fuel cell 3.

Moreover, an interconnector 22 is disposed on the other flat surface of the fuel cell 3, and a plurality of fuel gas channels 24 through which a fuel gas flows are provided inside the support 23.

Moreover, the outer surface (upper surface) of the interconnector 22 may be provided with a P-type semiconductor layer 25. In FIG. 2B, there is shown a case where the P-type semiconductor layer 25 is provided. By connecting the power-collecting member 16 to the interconnector 22 via the P-type semiconductor layer 25, it is possible to establish ohmic contact between the power-collecting member 16 and the interconnector 22, and thereby reduce potential drop and effectively avoid deterioration in power collection capability.

Moreover, the support 23 serves also as the fuel electrode layer 19, and the fuel cell 3 can be configured by laminating the solid electrolyte layer 20 and the oxygen electrode layer 21 one after another on one of the opposed surfaces of the support 23.

The following describes the constituent members of the fuel cell 3 shown in FIGS. 2A and 2B.

The fuel electrode layer 19 may be formed of known typical materials, for example, porous conductive ceramics such as $ZrO_2$ containing rare-earth element oxide in the form of solid solution (called stabilized zirconia, inclusive of partially-stabilized zirconia), and Ni, and also/or NiO.

The solid electrolyte layer 20 has a function as an electrolyte for providing electron linkage between the electrodes, and gas shutoff capability for preventing leakage of a fuel gas and an oxygen-containing gas. The solid electrolyte layer 20 is formed of $ZrO_2$ containing rare-earth element oxide in the form of solid solution in an amount of 3% to 15% by mole. Instead of $ZrO_2$, the solid electrolyte layer 20 may be formed of other material which achieves the described characteristics.

With no specific limitation imposed upon the material of formation of the oxygen electrode layer 21, the oxygen electrode layer 21 can be formed of, for example, conductive ceramics composed of so-called $ABO_3$ perovskite oxide. The oxygen electrode layer 21 has gas permeability, and, open porosity thereof can be greater than or equal to 20%, or can fall in the range of 30% to 50%, in particular.

The interconnector 22 may be formed of conductive ceramics. The interconnector 22 has resistance to reduction, as well as resistance to oxidation, because of contacting with a fuel gas (hydrogen-containing gas) and an oxygen-containing gas (air, etc.), and may thus be formed of lanthanum chromite-based perovskite oxide ($LaCrO_3$ oxide). The interconnector 22 is made dense for prevention of leakage of a fuel gas flowing through the fuel gas channel 24 formed in the support 23 and an oxygen-containing gas flowing outside the fuel cell 3, and, the relative density of the interconnector 22 is greater than or equal to 93%, or greater than or equal to 95%, in particular.

The support 23 has gas permeability to enable a fuel gas to permeate to the fuel electrode layer 19, and also has electrical conductivity for power collection via the interconnector 22. Thus, as the material of formation of the support 23, one having the above-described characteristics, for example, conductive ceramics or cermet can be used.

In producing the fuel cell 3, where the support 23 is formed through co-firing with the fuel electrode layer 19 or the solid electrolyte layer 20, the support 23 may be formed of an iron-group metal component such as Ni and a specific rare earth oxide such as $Y_2O_3$. Moreover, in order to provide fuel gas permeability, the support 23 has an open porosity of greater than or equal to 30%, or an open porosity of 35% to 50%, in particular. In addition, the electrical conductivity of the support 23 may be 50 S/cm or greater, or, may be 300 S/cm or greater, or, may be 440 S/cm or greater.

Exemplary of the P-type semiconductor layer 25 is a layer formed of transition metal perovskite oxide. More specifically, the layer may be formed of an oxide which is greater in electron conductivity than lanthanum chromite-based perovskite oxide ($LaCrO_3$) constituting the interconnector 22, for example, at least one of those having Sr (strontium) and La (lanthanum) in co-residing relation in the A-site, namely $LaSrCoFeO_3$-based oxide (for example, LaSr-$CoFeO_3$), $LaMnO_3$-based oxide (for example, $LaSrMnO_3$), $LaFeO_3$-based oxide (for example, $LaSrFeO_3$), and $LaCoO_3$-based oxide (for example, $LaSrCoO_3$). The P-type semiconductor layer 25 is advisably formed of LaSr-$CoFeO_3$-based oxide, in particular, considering that it exhibits high electrical conductivity at an operating temperature of the order of 600° C. to 1000° C. The oxide may contain, in addition to Co, Fe and Mn in the B-site. Under normal circumstances, the P-type semiconductor layer 25 has a thickness of 30 μm to 100 μm.

The individual fuel cells 3 are electrically connected in series with each other, with the power-collecting member 16 interposed therebetween. The power-collecting member 16 may be composed of a member formed of an elastic metal or alloy, or a member obtained by applying a predetermined surface treatment to a felt formed of metallic fiber or alloy fiber.

Moreover, since the power-collecting member 16 is exposed to elevated temperatures in an oxidizing atmosphere during power-generating operation of the fuel cell apparatus, the power-collecting member 16 may thus be produced from a Cr-containing alloy. In addition, the surface of the power-collecting member 16 may be coated in part or in whole with rare-earth element-containing perovskite oxide, etc.

The longitudinal length and the widthwise length of the power-collecting member 16 may be adjusted to be greater than or equal to the longitudinal length and the widthwise length, respectively, of the power-generating section. This allows efficient collection of electric current obtained by the power-generating operation.

In the fuel cell apparatus, in addition to the module 1, a heat exchanger 13 for carrying out heat exchange between a medium and exhaust gas from the module 1, and auxiliaries for operating the module 1, including various pumps and a control unit, are accommodated in an exterior case. With such an arrangement, however, as has been conventional, the fuel cell apparatus may inevitably have a long heightwise length, and consequently, for example, the placement of the apparatus in an apartment house will be difficult.

In this regard, in the fuel cell apparatus according to a non-limiting embodiment non-limiting embodiment as shown in FIG. 1, the heat exchanger 13 is arranged laterally to the housing 2. As distinct from the conventional case where a heat exchanger is mounted below the module, disposing the heat exchanger laterally relative to the housing makes it possible to reduce the heightwise length of the fuel cell apparatus, and thus allows a reduction in heightwise dimension.

In the interior of the heat exchanger 13, exhaust gas and a medium are passed therethrough for heat exchange, and, the temperature of the exhaust gas decreases after the heat exchange. Thus, the heat exchanger 13 is provided with an exhaust gas inlet and an exhaust gas outlet, and a medium inlet 14 and a medium outlet 15 as will hereafter be described. Moreover, passing exhaust gas and a medium in counter-flowing relation allows efficient heat exchange. As the heat exchanger 13, for example, it is possible to use a plate-fin heat exchanger.

Figure 3A:
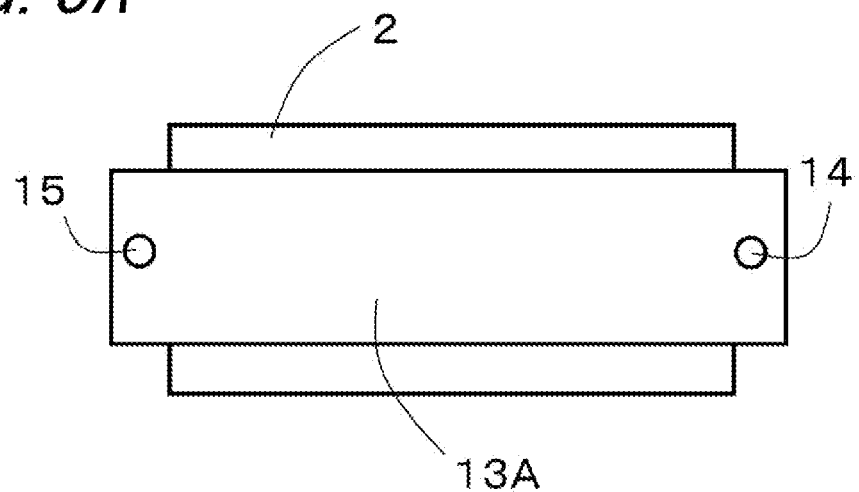
FIG. 3A and FIG. 3B are side views showing the layout of the fuel cell module according to a non-limiting embodiment and heat exchanger.
Figure 3B:
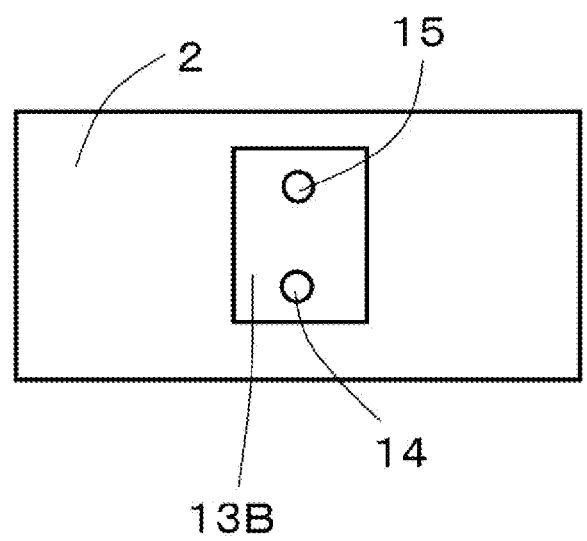

FIGS. 3A and 3B are side views showing the layout of the module 1 according to the embodiment and heat exchangers 13A and 13B.

As described above, in the fuel cell apparatus according to the embodiment, a reduction in heightwise dimension can be achieved. Thus, as exemplary of the heat exchanger, as shown in FIG. 3A, the heat exchanger 13A is configured so that a height thereof falls within the range of the height of the housing 2 as seen in side view. Note that, in FIG. 3A, the heat exchanger 13A is made larger in width than the housing 2. The heat exchanger 13A is widthwise oriented so that the inlet 14 and the outlet 15 are aligned in the widthwise direction of the heat exchanger 13A. Such an arrangement allows an increase in the length of the flow channel of the heat exchanger 13A, and thus can carry out more efficient heat exchange. The heat exchanger 13A shown in FIG. 3A is configured so that a medium, such as water, which serves for heat exchange in conjunction with exhaust gas, flows from side to side.

On the other hand, the heat exchanger 13B shown in FIG. 3B is configured so that a contour thereof falls within the range of the contour of the housing 2 as seen in side view. This allows not only a reduction in heightwise dimension but also a reduction in widthwise dimension. The heat exchanger 13B is heightwise oriented so that the inlet 14 and the outlet 15 are aligned in the heightwise direction of the heat exchanger 13B. The heat exchanger 13B may be placed so that the outlet 15 is spaced above the inlet 14 in the heightwise direction.

Moreover, the heat exchanger 13 may be obliquely oriented so that the inlet 14 and the outlet 15 are aligned in a slanting direction relative to a vertical direction (horizontal direction). The heat exchanger 13 may be placed so that the outlet 15 is spaced above the inlet 14 in the slanting direction.

Figure 4:
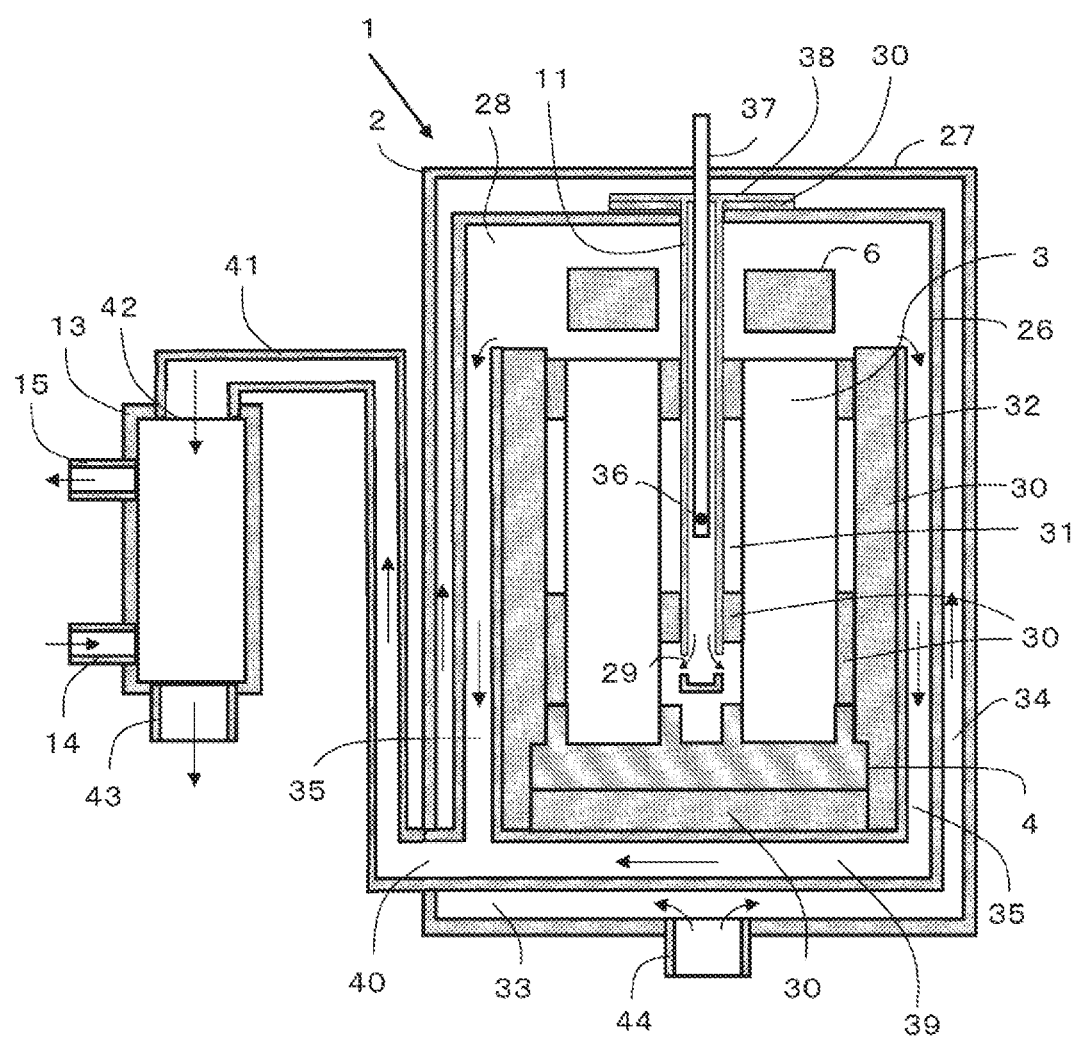
FIG. 4 is a sectional view showing an example of a part extracted from the fuel cell apparatus according to a non-limiting embodiment.

FIG. 4 is a sectional view showing an example of the module 1 and the heat exchanger 13 extracted from the fuel cell apparatus according to a non-limiting embodiment. The structure of the module 1 will be described first.

As shown in FIG. 4, the housing 2 constituting the module 1 has a double-walled structure having an inner wall 26 and an outer wall 27. The outer wall 27 defines the outer frame of the housing 2, and the inner wall 26 defines a power-generating chamber 28 for housing therein the cell stack device 12. Moreover, in the housing 2, an oxygen-containing gas introducing tube 44 for introducing an oxygen-containing gas to be introduced into the fuel cell 3, is connected to the bottom of the housing 2. The oxygen-containing gas introduced through the oxygen-containing gas introducing tube 44 flows through an oxygen-containing gas channel 34 between the inner wall 26 and the outer wall 27.

An oxygen-containing gas introducing member 11 is inserted into the housing 2 from a top thereof so as to pass through the inner wall 26, and is fixed to the interior of the housing 2. The oxygen-containing gas introducing member 11 is provided with, on an upper end side thereof, an oxygen-containing gas inlet (not shown) for introducing an oxygen-containing gas, and a flange portion 38, and also has, on a lower end side thereof, an oxygen-containing gas outlet 29 for introducing the oxygen-containing gas into the lower end of the fuel cell 3. A heat-insulating member 30 is disposed between the flange portion 38 and the inner wall 26.

Although the oxygen-containing gas introducing member 11 is illustrated as being located between the two cell stacks 5 lying in juxtaposition inside the housing 2 in FIG. 4, the arrangement of the oxygen-containing gas introducing member 11 may be suitably adjusted depending on the number of the cell stacks 5. For example, when placing only one cell stack 5 inside the housing 2, two oxygen-containing gas introducing members 11 may be disposed on opposite side faces, respectively, of the cell stack 5 so as to sandwich the cell stack 5 therebetween, or alternatively, the oxygen-containing gas introducing member 11 may be disposed only on one side of the cell stack 5.

Moreover, in the interior of the power-generating chamber 28, to avoid that heat present in the module 1 is considerably dissipated to such an extent that a temperature decrease in the fuel cell 3 (the cell stack 5) results with consequent reduction in the amount of electric power generation, there is suitably provided a heat-insulating member 30 for maintaining the internal temperature of the module 1 at a high-temperature level.

The heat-insulating member 30 may be disposed in the vicinity of the cell stack 5. The heat-insulating member 30 may be disposed on a lateral side of the cell stack 5 along an arrangement direction of the fuel cells 3, and, the heat-insulating member 30 so placed may have a width which is equivalent to or greater than the width of the side face of the cell stack 5 in the arrangement direction of the fuel cells 3. The heat-insulating member 30 may also be disposed on both lateral sides of the cell stack 5. This makes it possible to reduce a temperature decrease in the cell stack 5 effectively. Moreover, the oxygen-containing gas introduced by the oxygen-containing gas introducing member 11 is restrained from being discharged sidewardly from the cell stack 5, thus facilitating the flow of the oxygen-containing gas between the fuel cells 3 constituting the cell stack 5. The heat-insulating members 30 disposed on both lateral sides of the cell stack 5 are provided with an opening 31 for adjusting the flow of the oxygen-containing gas which is fed to the fuel cell 3 and reducing variations in temperature distribution in the lengthwise direction of the cell stack 5, as well as in the stacking direction of the fuel cells 3.

Moreover, an inner wall for exhaust gas 32 is disposed inside the inner wall 26 along an arrangement direction of the fuel cells 3, and, a region between the inner wall 26 and the side face of the inner wall for exhaust gas 32 defines a first exhaust gas channel 35 (35A, 35B) through which exhaust gas present in the power-generating chamber 28 flows from above downward. In addition, a region between the inner wall 26 and the bottom of the inner wall for exhaust gas 32 defines a second exhaust gas channel 39. The exhaust gas flowing from above downward within that one of the first exhaust gas channels 35 located at one lateral side of the housing 2 and the exhaust gas flowing similarly within the other located at the other lateral side of the housing 2 merge with each other in the second exhaust gas channel 39 located on the lower side of the module 1. The merged exhaust gas subsequently flows toward a vent 40 provided in a side face of the housing opposed to the heat exchanger 13.

Inside the oxygen-containing gas introducing member 11, a thermocouple 37 for measuring temperatures in the vicinity of the cell stack 5 is disposed so that a temperature-measuring section 36 thereof is located at a center in the lengthwise direction of the fuel cell 3, as well as at a center in the arrangement direction of the fuel cells 3.

Moreover, in the module 1 thus constructed, the fuel cell 3 can be raised in temperature and maintained at an elevated temperature by burning the oxygen-containing gas and a fuel gas left unused for power generation discharged through the fuel gas channel of the fuel cell 3 in a location between the upper end of the fuel cell 3 and the reformer 6. Besides, the reformer 6 situated above the fuel cell 3 (the cell stack 5) can be warmed, and is thus capable of inducing a reforming reaction efficiently. During normal power-generating operation, due to the above-described burning process and power-generating action of the fuel cell 3, the internal temperature of the module 1 is raised to about 500° C. to 800° C.

In the module 1 shown in FIG. 4, the vent 40 for the exhaust gas is positioned in the side face of the housing 2 opposed to the heat exchanger 13. If the vent is positioned in the bottom of the module, exhaust gas piping for connecting the bottom of the module and the heat exchanger will extend downward from the bottom of the module once, or extend along the bottom of the module. In consequence, the heightwise dimension-reduction effect is impaired to an extent corresponding to the length of the downwardly-extending part of the exhaust gas piping or the exhaust gas piping in itself.

In this regard, as practiced in the module 1 shown in FIG. 4, with the exhaust gas vent 40 positioned in the side face of the housing 2 opposed to the heat exchanger 13, it never occurs that exhaust gas piping 41 for connecting the vent 40 and an exhaust gas inlet 42 provided in the heat exchanger 13 is located below the module 1. This makes it possible to enhance the heightwise dimension-reduction effect, and thereby achieve further reduction in the size of the apparatus in the heightwise direction.

The exhaust gas introduced through the inlet 42 of the heat exchanger 13 undergoes heat exchange with a medium, and is then discharged from an outlet 43 provided in the bottom of the heat exchanger 13. A recovery portion for recovering water vapor contained in the exhaust gas as condensate may be provided following the heat exchanger 13 or utilizing the outlet 43 of the heat exchanger 13.

Figure 5:
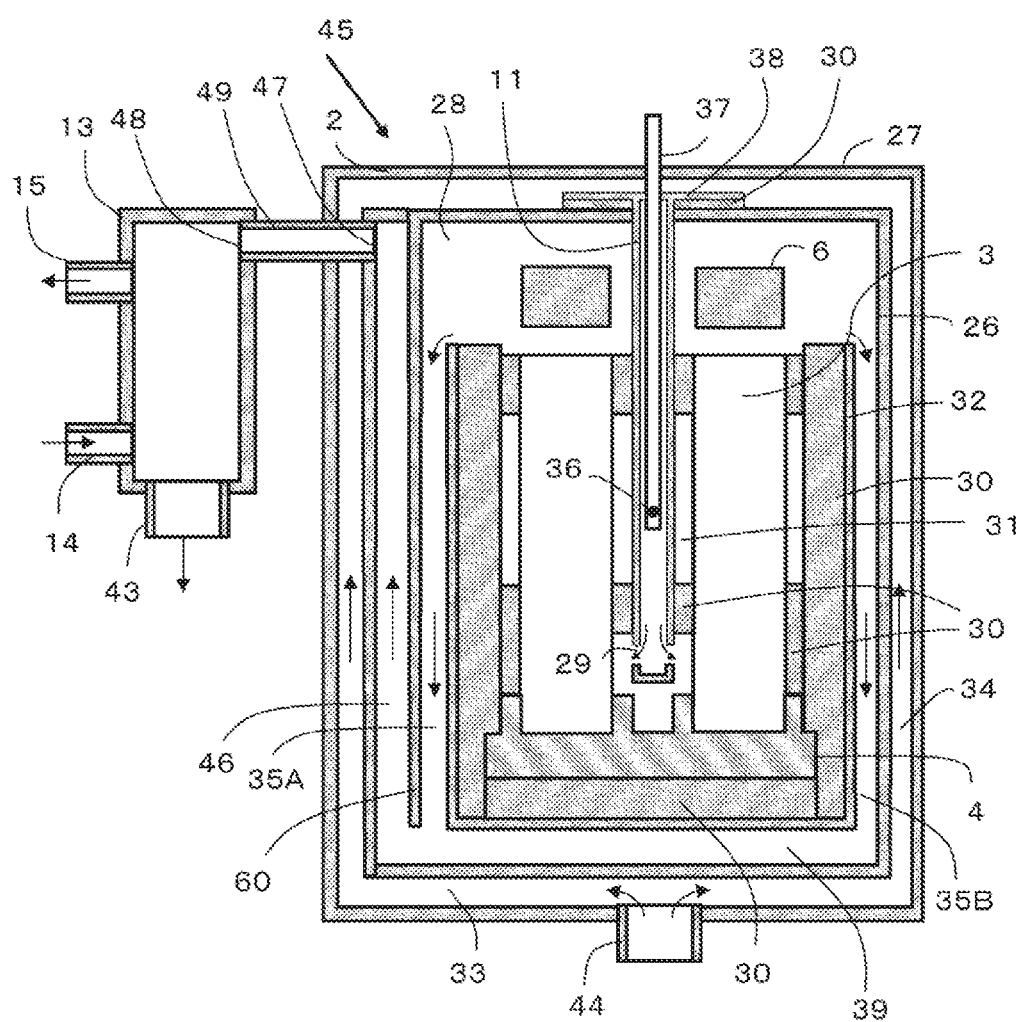
FIG. 5 is a sectional view showing another example of a part extracted from the fuel cell apparatus according to a non-limiting embodiment.
Figure 6:
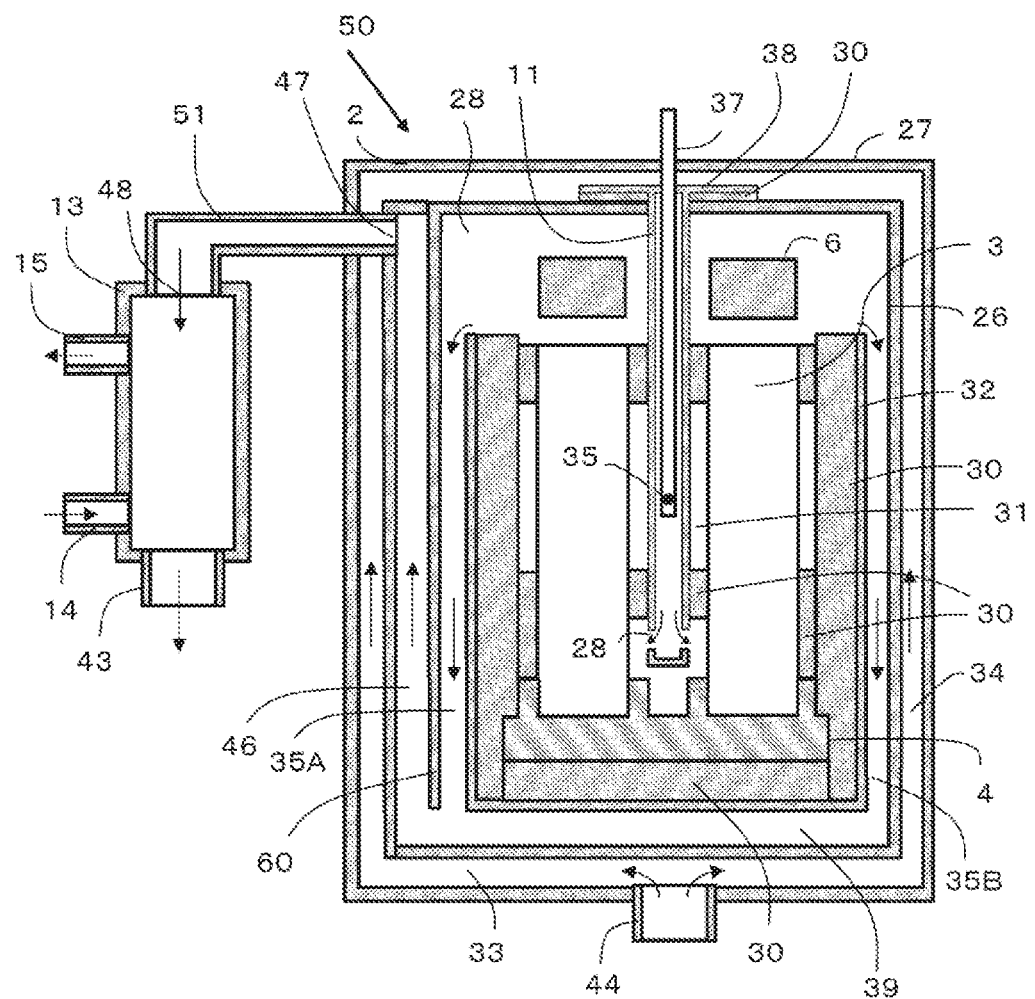
FIG. 6 is a sectional view showing still another example of a part extracted from the fuel cell apparatus according to a non-limiting embodiment.

FIG. 5 is a sectional view showing another example of a module 45 and a heat exchanger 13 extracted from the fuel cell apparatus according to a non-limiting embodiment, and FIG. 6 is a sectional view showing still another example of a module 50 and a heat exchanger 13 extracted from the fuel cell apparatus according to a non-limiting embodiment. The following description deals mainly with the points of difference from the construction shown in FIG. 4.

In the module 45 shown in FIG. 5, as well as in the module 50 shown in FIG. 6, a partition wall 60 is disposed between the inner wall 26 and the inner wall for exhaust gas 32 located on the heat exchanger 13 side. The placement of the partition wall 60 enables a third exhaust gas channel 46 to be disposed next to the first exhaust gas channel 35A. That is, the exhaust gas channel includes the first exhaust gas channel 35 through which exhaust gas flows from above downward, and the third exhaust gas channel 46 through which exhaust gas flows from below upward. This makes it possible to increase the length of the exhaust gas channel, and thereby increase the area of the region capable of heat exchange.

Moreover, in the module 45 shown in FIG. 5, as well as in the module 50 shown in FIG. 6, the third exhaust gas channel 46 communicates with the second exhaust gas channel 39, and thus, after flowing through the second exhaust gas channel 39, the exhaust gas flows through the third exhaust gas channel 46 from below upward.

A vent 47 is located at the upper end of the third exhaust gas channel 46. In FIG. 5, there is shown a case where the vent 47 and an exhaust gas inlet 48 of the heat exchanger 13 are positioned at the same level when viewed in section, whereas, in FIG. 6, there is shown a case where the vent 47 is located above the level of the exhaust gas inlet 48 of the heat exchanger 13.

In the module 1 shown in FIG. 4, due to the vent 40 being located toward the bottom of the housing 2, there is provided the long exhaust gas piping 41 for connecting the vent 40 and the exhaust gas inlet 42 located on the top of the heat exchanger 13. In contrast, where the vent 47 is positioned at the same level as or above the level of the exhaust gas inlet 48 of the heat exchanger 13, exhaust gas pipings 49 and 51 can be made shorter. Thus, the fuel cell apparatus can be made simpler in structure, and also, with no extra space left between the exhaust gas piping 41 and the module 1, the fuel cell apparatus can be downsized.

The third exhaust gas channel 46, through which exhaust gas flows from below upward, communicates with the vent 47. In the modules 45 and 50 shown in FIGS. 5 and 6, respectively, the third exhaust gas channel 46 is, as exemplified, adjacent to both the first exhaust gas channel 35A and the oxygen-containing gas channel 34. That is, the exhaust gas flowing through the third exhaust gas channel 46 undergoes heat exchange with the exhaust gas flowing through the first exhaust gas channel 35A and the oxygen-containing gas flowing through the oxygen-containing gas channel 34.

More specifically, the exhaust gas flowing through the third exhaust gas channel 46 is lowered in temperature as it flows through the third exhaust gas channel 46 due to heat exchange with the oxygen-containing gas flowing through the oxygen-containing gas channel 34. That is, looking at the third exhaust gas channel 46, the exhaust gas is subjected to a high temperature in a lower part of the channel, and is subjected to a low temperature in an upper part of the channel.

Moreover, in the power-generating chamber 28, during the burning of a fuel gas left unused for power generation in a location above the fuel cell 3, the lower part of the power-generating chamber 28 has a low temperature, and the upper part thereof has a high temperature. Correspondingly, the exhaust gas flowing through the first exhaust gas channel 35A, 35B, is subjected to a low temperature in a lower part of the channel, and is subjected to a high temperature in an upper part of the channel.

Thus, arranging the first exhaust gas channel 35A and the third exhaust gas channel 46 adjacent each other permits heat exchange between the exhaust gas flowing through the first exhaust gas channel 35A and the exhaust gas flowing through the third exhaust gas channel 46. This arrangement provides an improvement in temperature distribution in the vertical direction, and thus provides an improvement in vertical temperature distribution in the interior of the power-generating chamber 28. This allows enhancement in power generation efficiency.

Moreover, the heat exchange between the exhaust gas flowing through the third exhaust gas channel 46 and the oxygen-containing gas flowing through the oxygen-containing gas channel 34 allows efficient warming of a low-temperature oxygen-containing gas introduced through the oxygen-containing gas introducing tube 44.

In the modules 45 and 50 each provided with the third exhaust gas channel 46, of the first exhaust gas channels 35A and 35B located at opposite lateral sides of the module, the first exhaust gas channel 35A closer to the third exhaust gas channel 46 may receive a greater amount of the flow of exhaust gas. This may cause a difference between the level of heat exchange between the exhaust gas flowing through the first exhaust gas channel 35A and the oxygen-containing gas flowing through the oxygen-containing gas channel 34, and the level of heat exchange between the exhaust gas flowing through the first exhaust gas channel 35B and the oxygen-containing gas flowing through the oxygen-containing gas channel 34. In order to make the amount of the exhaust gas flowing through each of the first exhaust gas channels 35A and 35B substantially the same, for example, it is advisable to reduce the channel width of the third exhaust gas channel 46-side first exhaust gas channel 35A, or to provide a regulating member for regulating the amount of the inflow of exhaust gas.

Although the housing 2 is, as exemplified, shaped in a rectangular parallelepiped, as long as the heat exchanger is disposed laterally relative to the housing 2, the housing 2 is not limited in shape to the rectangular parallelepiped. For example, the housing 2 may be cylindrically shaped, or may be shaped in a rectangular column such as a cube or a hexagonal column. In the housing in the form of a rectangular column, in particular, the heat exchanger 13 can be easily disposed so as to face one of the side faces of the housing which has the largest area. In this case, the heat exchanger 13 itself can be made larger and heat-exchange efficiency can be improved. As long as the heat exchanger 13 is disposed so as to face a side face of the housing, depending on performance capability, size, etc. of the heat exchanger 13, the heat exchanger 13 may be mounted so as to face other side face than the side face having the largest area.

Figure 7:
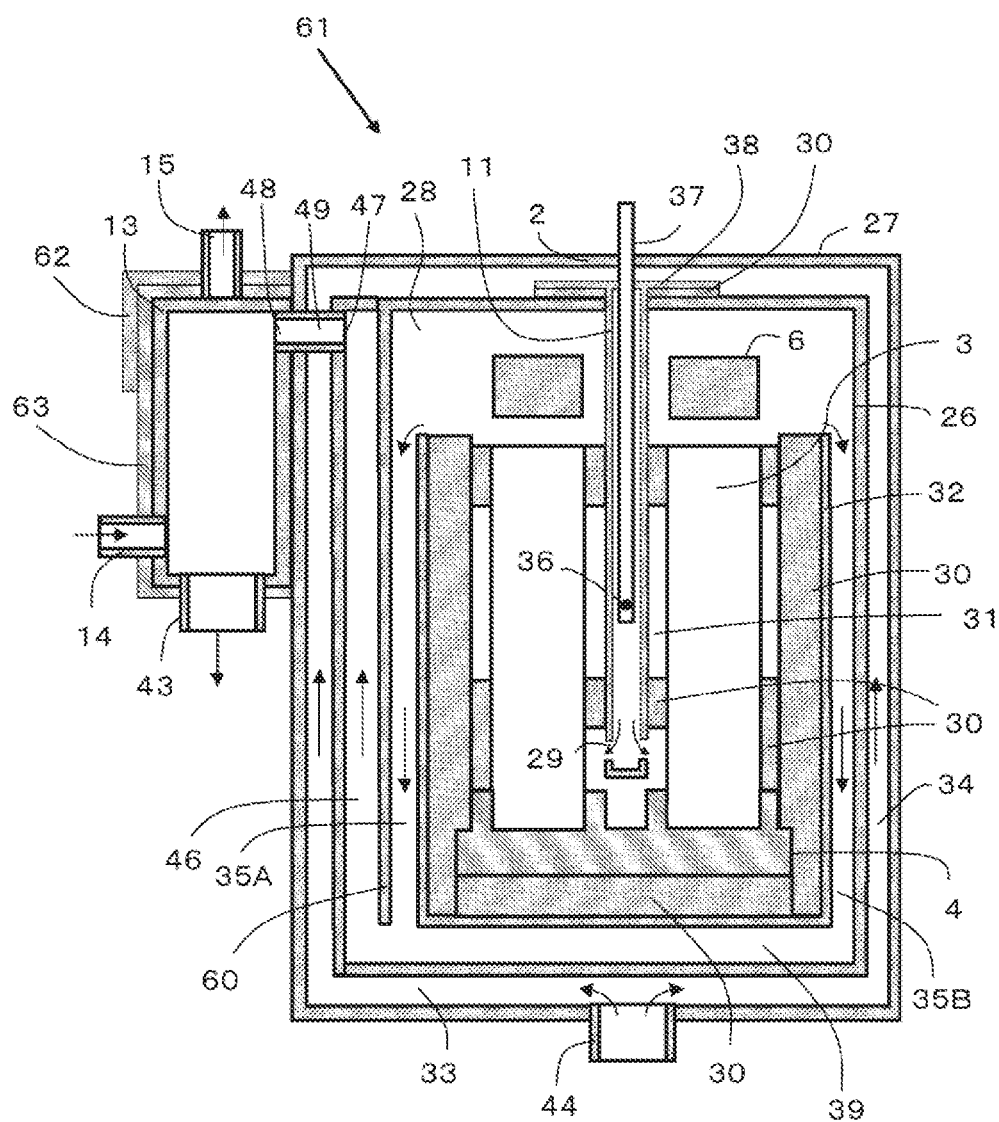
FIG. 7 is a sectional view showing still another example of a part extracted from the fuel cell apparatus according to a non-limiting embodiment.
Figure 8:
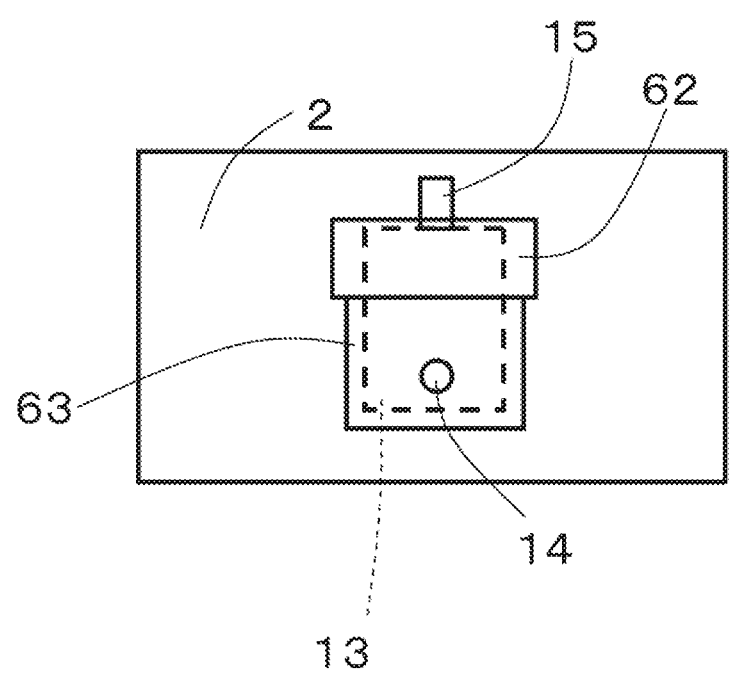
FIG. 8 is a side view showing a module and an heat exchanger according to a non-limiting embodiment.

FIG. 7 is a sectional view showing yet another example of a module 61 and a heat exchanger 13 extracted from the fuel cell apparatus according to a non-limiting embodiment, and FIG. 8 is a side view showing the module 61 and the heat exchanger 13. The following description deals mainly with the points of difference from the construction shown in FIG. 5.

As contrasted to such a construction as shown in, for example, FIG. 5 in which the heat exchanger 13 is disposed apart from the side face of the housing 2 so as to face the side face of the housing 2, in a non-limiting embodiment, as shown in FIG. 7, the heat exchanger 13 is disposed in contact with the side face of the housing 2. In the module 61 shown in FIG. 7, the vent 47 and the exhaust gas inlet 48 of the heat exchanger 13 are positioned at the same level. This enables the exhaust gas piping 49 to have a length short enough to place the heat exchanger 13 in contact with the side face of the housing 2.

The outer surface of the heat exchanger 13 may be covered with a heat insulator to prevent the decreased efficiency of heat exchange between a medium and exhaust gas in the heat exchanger 13. For example, in the heat exchanger 13 as shown in FIGS. 4 to 6, the entire outer surface of the heat exchanger 13 is covered with the heat insulator except the area for connection with the exhaust gas piping 41, 49, 51 and the areas corresponding to the inlet 14 and the outlet 15. On the other hand, in a non-limiting embodiment, due to the heat exchanger 13 being kept in contact with the side face of the housing 2, the entire outer surface of the heat exchanger 13 is covered with a heat insulator 63 except, in addition to the described areas, the area in contact with the housing 2. That is, since part of the heat exchanger 13 kept in contact with the housing 2 is not covered with the heat insulator 63, the amount of the heat insulator for use can be reduced correspondingly.

Moreover, in a non-limiting embodiment, there is provided a cover member 62 for covering the upper part of the heat exchanger 13 kept in contact with the side face of the housing 2. The cover member 62 covers the upper part of the heat exchanger 13 from four directions, with the exclusion of the lower part and the housing 2-side part of the heat exchanger 13, and for example, the cover member 62 is secured to the side face of the housing 2 by fixing means such as screwing.

A spacing of certain width is left between the cover member 62 and the outer surface of the heat exchanger 13, and, the heat insulator 63 covering the heat exchanger 13 is partly inserted in the spacing between the cover member 62 and the heat exchanger 13, and is thus retained between the inner surface of the cover member 62 and the outer surface of the upper part of the heat exchanger 13. With the upper part of the heat insulator 63 retained, the heat insulator 63 stays in hanging-down condition, and thus other part of the heat insulator 63 than the retained part can also be retained in contact with the outer surface of the heat exchanger 13. Note that the other part of the heat insulator 63 than the retained part may be secured to the outer surface of the heat exchanger 13 by additional use of a securing member.

Figure 9:
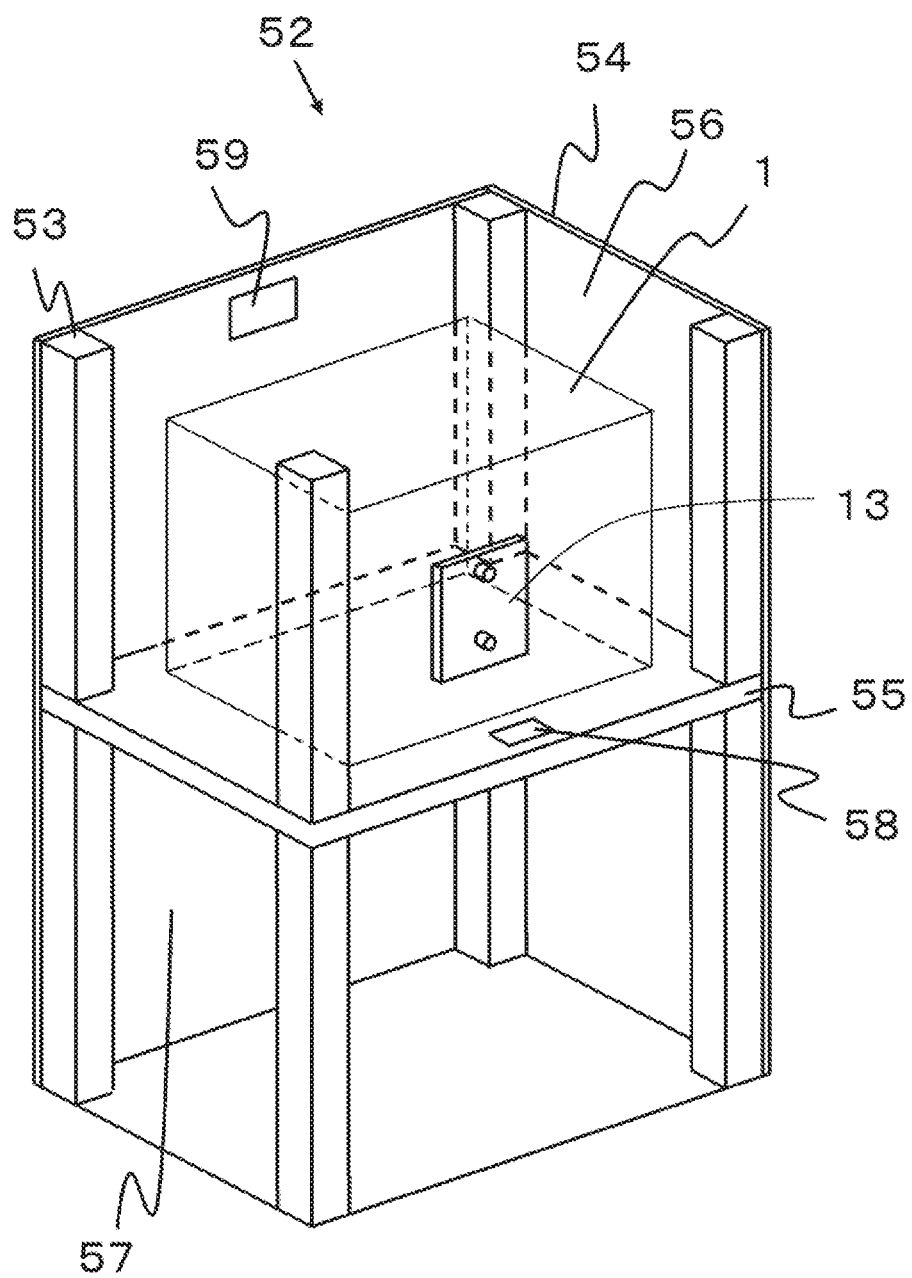
FIG. 9 is an exploded perspective view schematically showing an example of the fuel cell apparatus according to a non-limiting embodiment.

FIG. 9 is an exploded perspective view showing an example of the fuel cell apparatus according to a non-limiting embodiment in which the module 1 shown in FIG. 1, the heat exchanger 13, and auxiliaries (not shown) for operating the module 1 are housed in an exterior case. In FIG. 9, part of the construction is omitted. While, in FIG. 9, the module 1 is shown by way of example, the above-described modules 45, 50, and 61 serve likewise.

In a fuel cell apparatus 52 shown in FIG. 9, the interior of the exterior case composed of a support 53 and an exterior plate 54 is divided into an upper space and a lower space by a partition plate 55, and, the upper space serves as a module housing chamber 56 for housing therein the module 1 and the heat exchanger 13 thus far described, and the lower space serves as an auxiliary housing chamber 57 for housing therein auxiliaries for operating the module 1. The auxiliaries housed in the auxiliary housing chamber 57 are not shown in the drawing.

Moreover, the partition plate 55 is provided with an air passage port 58 for allowing air present in the auxiliary housing chamber 57 to flow into the module housing chamber 56, and, part of the exterior plate 54 defining the module housing chamber 56 is provided with an air outlet 59 for discharging air present in the module housing chamber 56.

In the fuel cell apparatus 52 thus constructed, as described above, the module 1 and the heat exchanger 13 are housed in the module housing chamber 56. This makes it possible to reduce the heightwise dimension of the auxiliary housing chamber 57, and thereby render the fuel cell apparatus 52 more compact.

The invention has been described in detail, it being understood that the invention is not limited to the embodiments as described heretofore, and various modifications, improvements or the like are possible without departing from the scope of the invention.

For example, although the foregoing description deals with the case where two cell stacks 5 are housed in the power-generating chamber 28, in the case of placing a single cell stack 5 in the power-generating chamber 28, the oxygen-containing gas channel 34 and the first exhaust gas channel 35 may be disposed only on one side of the cell stack 5.

Moreover, although the third exhaust gas channel 46 is disposed inside the oxygen-containing gas channel 34, for example, the third exhaust gas channel 46 may be disposed outside the oxygen-containing gas channel 34.

Moreover, although the foregoing description deals with the case of using the fuel cell 3 of so-called longitudinal stripe configuration, it is also possible to use a segmented-in-series fuel cell stack including a plurality of power-generating element portions of so-called circumferential stripe configuration mounted on a support.

The invention may be carried into effect in other various forms without departing from its spirit and principal features. Thus, the foregoing embodiments will be considered in all respects as illustrative only, and the scope of the invention is not to be restricted by the body of the specification but to be shown as the scope of the appended claims. Moreover, all such changes and modifications as fall within the scope of the claims are considered as coming within the scope of the invention.

REFERENCE SIGNS LIST 1, 45, 50, 61: Fuel cell module
2: Housing
3: Fuel cell
13: Heat exchanger
35(35A, B): First exhaust gas channel
39: Second exhaust gas channel
40, 47: Vent
42, 48: Inlet
46: Third exhaust gas channel

What is claimed is:

1. A fuel cell apparatus, comprising:
a fuel cell module extending height-wise from a first end to a second end that is opposite the first end, the fuel cell module comprising a housing, a reformer housed in the housing and located at the second end of the fuel cell module, and a fuel cell housed in the housing and located intervening between the first end and the second end of the fuel cell module, the fuel cell configured for generating electric power with use of a fuel gas and an oxygen-containing gas;
a heat exchanger located outside of the housing configured for carrying out heat exchange between water and exhaust gas from the fuel cell,
the heat exchanger arranged horizontally lateral to the housing; and
the housing internally comprising:
an oxygen-containing gas channel configured to supply the oxygen-containing gas to the fuel cell,
a first exhaust gas channel through which the exhaust gas coming from the fuel cell is configured to flow from the second end to the first end of the fuel cell module, and
a third exhaust gas channel through which the exhaust gas coming from the first exhaust gas channel is configured to flow to the heat exchanger flowing from the first end to the second end of the fuel cell module,
the first exhaust gas channel and the third exhaust channel connected to each other with the exhaust gas from the fuel cell configured to first flow through an area proximate to the reformer and into the first exhaust gas channel and then into the third exhaust gas channel,
the first exhaust gas channel, the third exhaust channel, and the oxygen-containing gas channel arranged substantially parallel and adjacent to each other in sequence with the first exhaust channel located closest to the fuel cell;

wherein a full vertical dimension of the heat exchanger connected to the third exhaust gas channel is confined within a full vertical dimension of the housing as seen in a side view of the fuel cell apparatus.

2. The fuel cell apparatus according to claim 1, wherein a perimeter of the heat exchanger is confined within a perimeter of the housing as seen in a side view of the fuel cell apparatus.

3. The fuel cell apparatus according to claim 1, wherein the housing is provided with a vent configured for discharging the exhaust gas which is positioned at a side face of the housing with the heat exchanger.

4. The fuel cell apparatus according to claim 3, wherein the heat exchanger is provided with an inlet configured for introducing the exhaust gas, and the vent is positioned at a same level as or above a level of the inlet of the heat exchanger.

5. The fuel cell apparatus according to claim 4, wherein the third exhaust gas channel communicates with the vent.

6. The fuel cell apparatus according to claim 1, wherein the housing is shaped as a rectangular column, and the heat exchanger is disposed so as to face a side face of the housing which has a largest area.

7. The fuel cell apparatus according to claim 1, wherein the housing is shaped in a rectangular column, and the heat exchanger is disposed on a side face of the housing so that part of the heat exchanger contacts with the side face of the housing.

8. The fuel cell apparatus according to claim 7, further comprising:

a cover member for covering an upper part of the heat exchanger.

9. The fuel cell apparatus according to claim 8, further comprising:

a heat insulator disposed on an outer surface of the heat exchanger, wherein the heat insulator is, at least partly, retained in a spacing left between the heat exchanger and the cover member.

10. The fuel cell apparatus according to claim 1, further comprising:

an exterior case which houses therein the fuel cell module and the heat exchanger.

11. The fuel cell apparatus according to claim 1, wherein the third exhaust gas channel is disposed outside the oxygen-containing gas channel.

12. The fuel cell apparatus according to claim 1, wherein the heat exchanger is disposed so as to face the third exhaust gas channel.

13. The fuel cell apparatus according to claim 1, further comprising:

an additional first exhaust gas channel through which the exhaust gas from the fuel cell is configured to flow from the second end to the first end of the fuel cell module; wherein the exhaust gas from the fuel cell flows through an area proximate to the reformer and into the first exhaust gas channel or the additional first exhaust channel; wherein the exhaust gas from the fuel cell coming from the first exhaust gas channel is configured to merge with the exhaust gas from the fuel cell coming from the additional first exhaust gas channel; and wherein the exhaust gas from the fuel cell that has merged from the first exhaust gas channel and the additional first exhaust gas channel is then configured to flow through the third exhaust gas channel.

14. A fuel cell apparatus, comprising:

a fuel cell module extending height-wise from a first end to a second end that is opposite the first end, the fuel cell module comprising a housing, a reformer housed in the housing and located at the second end of the fuel cell module, and a fuel cell housed in the housing and located intervening between the first end and the second end of the fuel cell module, the fuel cell configured for generating electric power with use of a fuel gas and an oxygen-containing gas;

a heat exchanger located outside of the housing configured for carrying out heat exchange using exhaust gas from the fuel cell, the heat exchanger arranged horizontally lateral to the housing; and the housing internally comprising:

a chamber above the fuel cell at the second end of the fuel cell module configured to collect the exhaust gas coming from the fuel cell, the reformer located in the chamber so that the exhaust gas from the fuel cell is configured to flow through an area of the chamber proximate to the reformer, a first exhaust gas channel in communication with the chamber and through which the exhaust gas coming from the chamber is configured to flow from the second end to the first end of the fuel cell module, a third exhaust gas channel in communication with the first exhaust gas channel and through which the exhaust gas coming from the first exhaust gas channel is configured to flow to the heat exchanger flowing from the first end to the second end of the fuel cell module, and an oxygen-containing gas channel adjacent to the third exhaust gas channel and configured to supply the oxygen-containing gas to the fuel cell;

wherein a full vertical dimension of the heat exchanger is confined within a full vertical dimension of the housing as seen in a side view of the fuel cell apparatus.

15. A fuel cell apparatus, comprising:

a fuel cell module extending height-wise from a first end to a second end that is opposite the first end, the fuel cell module comprising a housing, a reformer housed in the housing and located at the second end of the fuel cell module, and a fuel cell housed in the housing and located intervening between the first end and the second end of the fuel cell module, the fuel cell configured for generating electric power with use of a fuel gas and an oxygen-containing gas;

a heat exchanger located outside of the housing configured for carrying out heat exchange using exhaust gas from the fuel cell, the heat exchanger arranged horizontally lateral to the housing and located on a side of the housing; and the housing internally comprising:

a plurality of first exhaust gas channels on opposing sides of the fuel cell through which the exhaust gas coming from the fuel cell is configured to flow first through an area proximate to the reformer and then into the plurality of first exhaust gas channels from the second end to the first end of the fuel cell module;

a second exhaust gas channel below the fuel cell at the first end of the fuel cell module that is in communication with the plurality of first gas channels through which the exhaust gas coming from the plurality of first exhaust gas channels is configured to be merged;

a third exhaust gas channel located on the side of the housing with the heat exchanger, the third exhaust gas channel in communication with the second exhaust gas channel, through which the exhaust gas coming from the second exhaust gas channel is configured to flow to the heat exchanger flowing from the first end to the second end of the fuel cell module; and a plurality of oxygen-containing gas channels configured to supply the oxygen-containing gas to the fuel cell and located, respectively, on the opposing sides of the fuel cell with each respective oxygen-containing gas channel of the plurality of oxygen-containing gas channels adjacent to one of the plurality of first exhaust gas channels or the third exhaust gas channel on the side of the housing with the heat exchanger, wherein a full vertical dimension of the heat exchanger is confined within a full vertical dimension of the housing as seen in a side view of the fuel cell apparatus.

16. The fuel cell apparatus according to claim 15, wherein the third exhaust gas channel is located farther away from the fuel cell than both the plurality of first exhaust gas channels and the plurality of oxygen-containing gas channels.

* * * * *